US010259523B2

(12) United States Patent
Nakai et al.

(10) Patent No.: US 10,259,523 B2
(45) Date of Patent: Apr. 16, 2019

(54) HYDRAULIC OPERATING SYSTEM

(71) Applicant: Shimano Inc., Sakai, Osaka (JP)

(72) Inventors: Mototsugu Nakai, Osaka (JP);
Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 152 days.

(21) Appl. No.: 15/660,511

(22) Filed: Jul. 26, 2017

(65) Prior Publication Data

US 2019/0031279 A1 Jan. 31, 2019

(51) Int. Cl.
*B62L 3/02* (2006.01)
*F15B 7/08* (2006.01)

(52) U.S. Cl.
CPC .............. *B62L 3/023* (2013.01); *F15B 7/08* (2013.01)

(58) Field of Classification Search
CPC ................................. B60T 11/22; B62L 3/023
See application file for complete search history.

(56) References Cited

U.S. PATENT DOCUMENTS

| | | | | |
|---|---|---|---|---|
| 2,741,896 A * | 4/1956 | Geiger | .................... | B60T 11/22 188/152 |
| 3,935,930 A * | 2/1976 | Kine | .................... | B62L 3/023 188/344 |
| 4,949,590 A * | 8/1990 | Barker | .................... | B60T 11/22 74/512 |
| 4,963,692 A * | 10/1990 | Halabiya | .................... | B60T 11/224 60/578 |
| 6,336,525 B1 * | 1/2002 | Leng | .................... | B62L 1/00 188/24.19 |
| 7,137,314 B2 * | 11/2006 | Ichida | .................... | B62K 23/06 74/502.2 |
| 7,530,435 B2 * | 5/2009 | Lumpkin | .................... | B60T 7/102 188/344 |
| 2002/0070084 A1 * | 6/2002 | Chou | .................... | B62L 1/00 188/24.11 |
| 2011/0240426 A1 * | 10/2011 | Hirose | .................... | B60T 7/102 188/344 |
| 2013/0333994 A1 * | 12/2013 | Jordan | .................... | B62L 3/02 188/344 |
| 2014/0060986 A1 * | 3/2014 | Miles | .................... | B62L 3/023 188/344 |

FOREIGN PATENT DOCUMENTS

EP 2338778 B1 1/2016

* cited by examiner

*Primary Examiner* — Michael Leslie
*Assistant Examiner* — Matthew Wiblin
(74) *Attorney, Agent, or Firm* — Global IP Counselors, LLP

(57) ABSTRACT

A hydraulic operating system for a small vehicle including a bicycle is basically provided with a base member, a piston, a hydraulic fluid chamber, a diaphragm and a deformation adjustment structure. The base member includes a cylinder bore. The piston is movably disposed in the cylinder bore. The hydraulic fluid chamber is fluidly connected to the cylinder bore. The diaphragm is at least partially defining the hydraulic fluid chamber. The diaphragm is deformed by fluid pressure in response to movement of the piston in the cylinder bore. The deformation adjustment structure is configured to selectively change a deformation condition of the diaphragm between at least two different deformation conditions.

16 Claims, 5 Drawing Sheets

HYDRAULIC OPERATING SYSTEM

BACKGROUND

Field of the Invention

This invention generally relates to a hydraulic operating system for a small vehicle. More specifically, the present invention relates to a bicycle hydraulic operating system in which a volume in a hydraulic passage can be adjusted to control an actuation point of a hydraulic operated device.

Background Information

Recently, small vehicles, in particular bicycles, have been provided with hydraulic operating systems such as a hydraulic brake system. The hydraulic operating system for a bicycle typically has a hydraulic operating (actuating) device that is fluidly connected to a hydraulic operated device by a hydraulic hose. The hydraulic operated device is hydraulically controlled by hydraulic fluid flowing through the hydraulic hose in response to an operation of the hydraulic operating device. For example, in the case of a hydraulic brake system, a brake caliper (i.e., the hydraulic operated device) is hydraulically controlled by hydraulic fluid flowing through the hydraulic hose in response to an operation of a brake lever of the hydraulic operating device. In particular, the operation of the brake lever forces hydraulic fluid through the hydraulic hose to the brake caliper. The hydraulic fluid then moves one or more pistons to cause the brake pads to squeeze a brake rotor that is attached to a hub of a bicycle wheel.

SUMMARY

Generally, the present disclosure is directed to various features of a hydraulic operating system for a small vehicle including a bicycle. Small vehicles as used herein refers to electric and non-electric vehicles regardless of the number of their wheels, but does not include four wheeled vehicles having an internal combustion engine as a power source for driving the wheels, or four wheeled electric vehicles that require a license to operate on public roads.

In one feature, a hydraulic operating system for a small vehicle including a bicycle is provided in which a volume in a hydraulic passage can be adjusted to control an actuation point of a hydraulic operated device.

In view of the state of the known technology and in accordance with a first aspect of the present disclosure, a hydraulic operating system for a small vehicle including a bicycle is provided that basically comprises a base member, a piston, a hydraulic fluid chamber, a diaphragm and a deformation adjustment structure. The base member includes a cylinder bore. The piston is movably disposed in the cylinder bore. The hydraulic fluid chamber is fluidly connected to the cylinder bore. The diaphragm is at least partially defining the hydraulic fluid chamber. The diaphragm is deformed by fluid pressure in response to movement of the piston in the cylinder bore. The deformation adjustment structure is configured to selectively change a deformation condition of the diaphragm between at least two different deformation conditions.

With the hydraulic operating system according to the first aspect, it is possible to adjust a volume in a hydraulic passage.

In accordance with a second aspect of the present invention, the hydraulic operating system according to the first aspect is configured so that the hydraulic fluid chamber is fluidly connected to the cylinder bore by a fluid port that is provided on the base member and opens to the cylinder bore at a first location outside of piston stroke of the piston.

With the hydraulic operating system according to the second aspect, it is possible to adjust the volume in the hydraulic passage to control a generation point of a hydraulic force provided to a hydraulic operated device.

In accordance with a third aspect of the present invention, the hydraulic operating system according to the first or second aspect is configured so that the base member includes a hydraulic fluid tank in which the diaphragm is at least partly arranged, and the hydraulic fluid chamber is defined between the hydraulic fluid tank and the diaphragm.

With the bicycle hydraulic operating system according to the third aspect, it is possible to easily provide the fluid hydraulic chamber in the hydraulic operating system.

In accordance with a fourth aspect of the present invention, the hydraulic operating system according to any one of the first to third aspects is configured so that the diaphragm defines a recess, and the deformation adjustment structure includes a projection that is disposed in the recess of the diaphragm.

With the hydraulic operating system according to the fourth aspect, it is possible to easily change the deformation condition of the diaphragm.

In accordance with a fifth aspect of the present invention, the hydraulic operating system according to the fourth aspect is configured so that the deformation adjustment structure includes a bolt that adjustably positions the projection in the recess of the diaphragm.

With the hydraulic operating system according to the fifth aspect, it is possible to easily adjust the deformation condition of the diaphragm.

In accordance with a sixth aspect of the present invention, the hydraulic operating system according to the fifth aspect is configured so that the hydraulic fluid chamber is partially defined by the base member, and the bolt is threaded to the base member.

With the hydraulic operating system according to the sixth aspect, it is possible to easily position the hydraulic fluid chamber and the deformation adjustment structure on the base member.

In accordance with a seventh aspect of the present invention, the hydraulic operating system according to the fifth or sixth aspect is configured so that the bolt and the projection are one-piece.

With the hydraulic operating system according to the seventh aspect, it is possible to reduce the number of parts of the deformation adjustment structure.

In accordance with an eighth aspect of the present invention, the hydraulic operating system according to any one of the fifth to seventh aspects is configured so that the diaphragm at least partly defines an air chamber, and the projection includes an air vent that fluidly communicates the air chamber with outside.

With the hydraulic operating system according to the eighth aspect, it is possible to minimize varying pressure and/or a partial vacuum occurring in the hydraulic fluid chamber.

In accordance with a ninth aspect of the present invention, the hydraulic operating system according to the eighth aspect is configured so that the bolt includes a tool engagement recess that is connected to the air vent.

With the hydraulic operating system according to the ninth aspect, it is possible to easily provide the air vent and to easily adjust the deformation condition of the diaphragm using the bolt.

In accordance with a tenth aspect of the present invention, the hydraulic operating system according to any one of the first to ninth aspects further comprises a hydraulic reservoir tank fluidly connected to the cylinder bore.

With the hydraulic operating system according to the tenth aspect, it is possible to keep suitable amount of hydraulic fluid in hydraulic passage.

In accordance with an eleventh aspect of the present invention, the hydraulic operating system according to the tenth aspect is configured so that the hydraulic reservoir tank includes an additional diaphragm at least partially defining an additional hydraulic fluid chamber and an additional air chamber.

With the hydraulic operating system according to the eleventh aspect, it is possible to minimize varying pressure and/or a partial vacuum occurring in the additional hydraulic fluid chamber.

In accordance with a twelfth aspect of the present invention, the hydraulic operating system according to the eleventh aspect is configured so that the additional hydraulic fluid chamber is fluidly connected to the cylinder bore by a reservoir port that opens to the cylinder bore at a second location inside of piston stroke of the piston.

With the hydraulic operating system according to the twelfth aspect, it is possible to close off the reservoir port during actuation of the piston to ensure good hydraulic pressure.

In accordance with a thirteenth aspect of the present invention, the hydraulic operating system according to any one of the eleventh to twelfth aspects is configured so that the additional hydraulic fluid chamber is partially defined by the base member.

With the hydraulic operating system according to the thirteenth aspect, it is possible to easily position the additional hydraulic fluid chamber on the base member.

In accordance with a fourteenth aspect of the present invention, the hydraulic operating system according to any one of the first to thirteenth aspects is configured so that it further comprises an operating member coupled to the piston to move the piston within the cylinder bore.

With the hydraulic operating system according to the fourteenth aspect, it is possible for a rider to easily operate the piston.

In accordance with a fifteenth aspect of the present invention, the hydraulic operating system according to the fourteenth aspect is configured so that the operating member includes a lever pivotally mounted relative to the base member.

With the hydraulic operating system according to the fifteenth aspect, it is possible for a rider to easily operate the operating member from a handlebar.

In accordance with a sixteenth aspect of the present invention, the hydraulic operating system according to any one of the first to fifteenth aspects is configured so that the base member includes a fixing structure configured to fix the hydraulic operating system to a body of the small vehicle.

With the hydraulic operating system according to the sixteenth aspect, it is possible to effectively position the base member in an appropriate location on the body of the small vehicle.

Also, other objects, features, aspects and advantages of the disclosed hydraulic operating system will become apparent to those skilled in the art from the following detailed description, which, taken in conjunction with the annexed drawings, discloses one embodiment of the hydraulic operating system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field, in particular the bicycle field from this disclosure that the following descriptions of the embodiments are provided for illustration only and not for the purpose of limiting the invention as defined by the appended claims and their equivalents.

Figure 1:
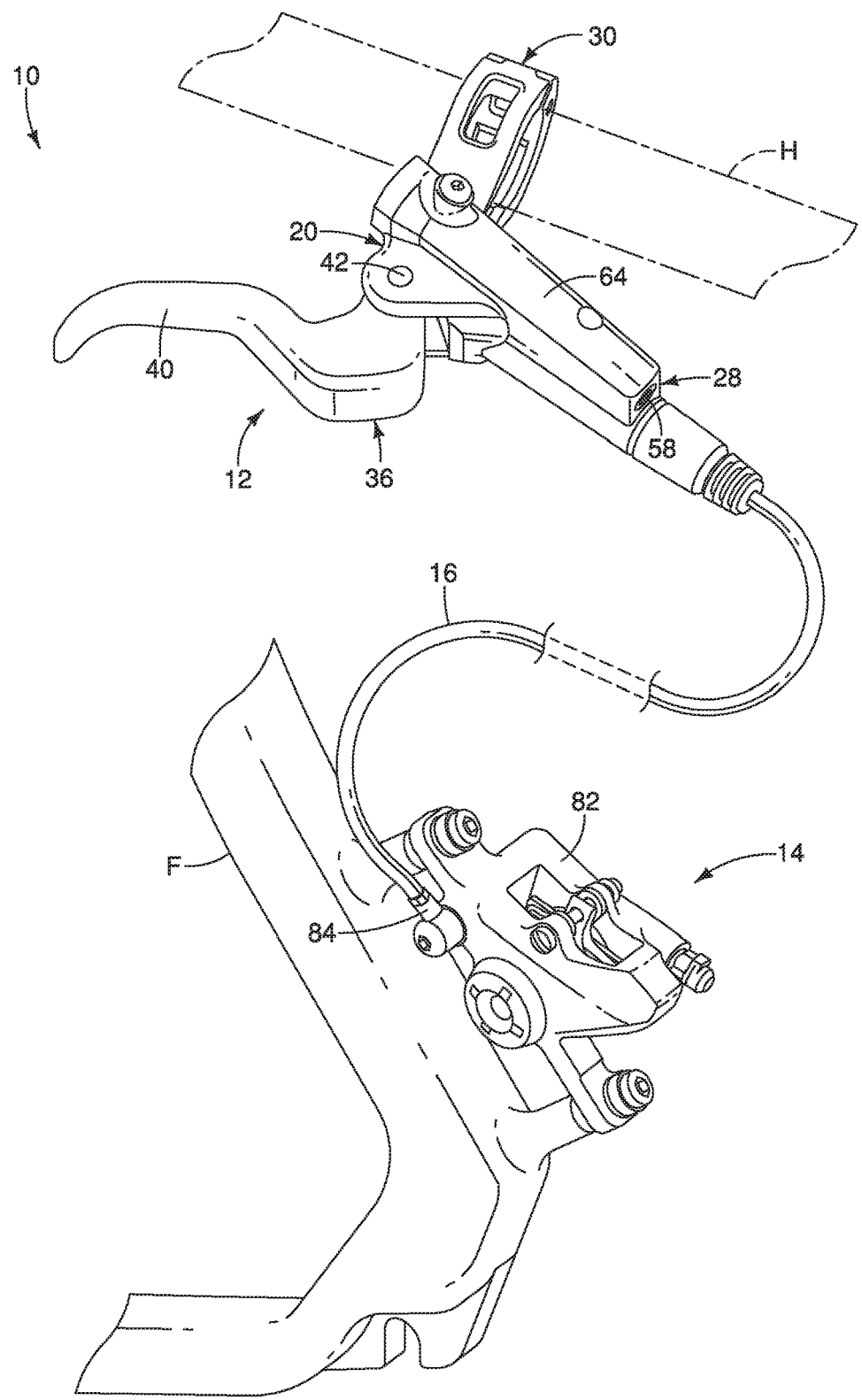
FIG. 1 is a perspective view of a hydraulic operating system having a hydraulic operated device and a hydraulic operating device in accordance with one illustrated embodiment.
Figure 2:
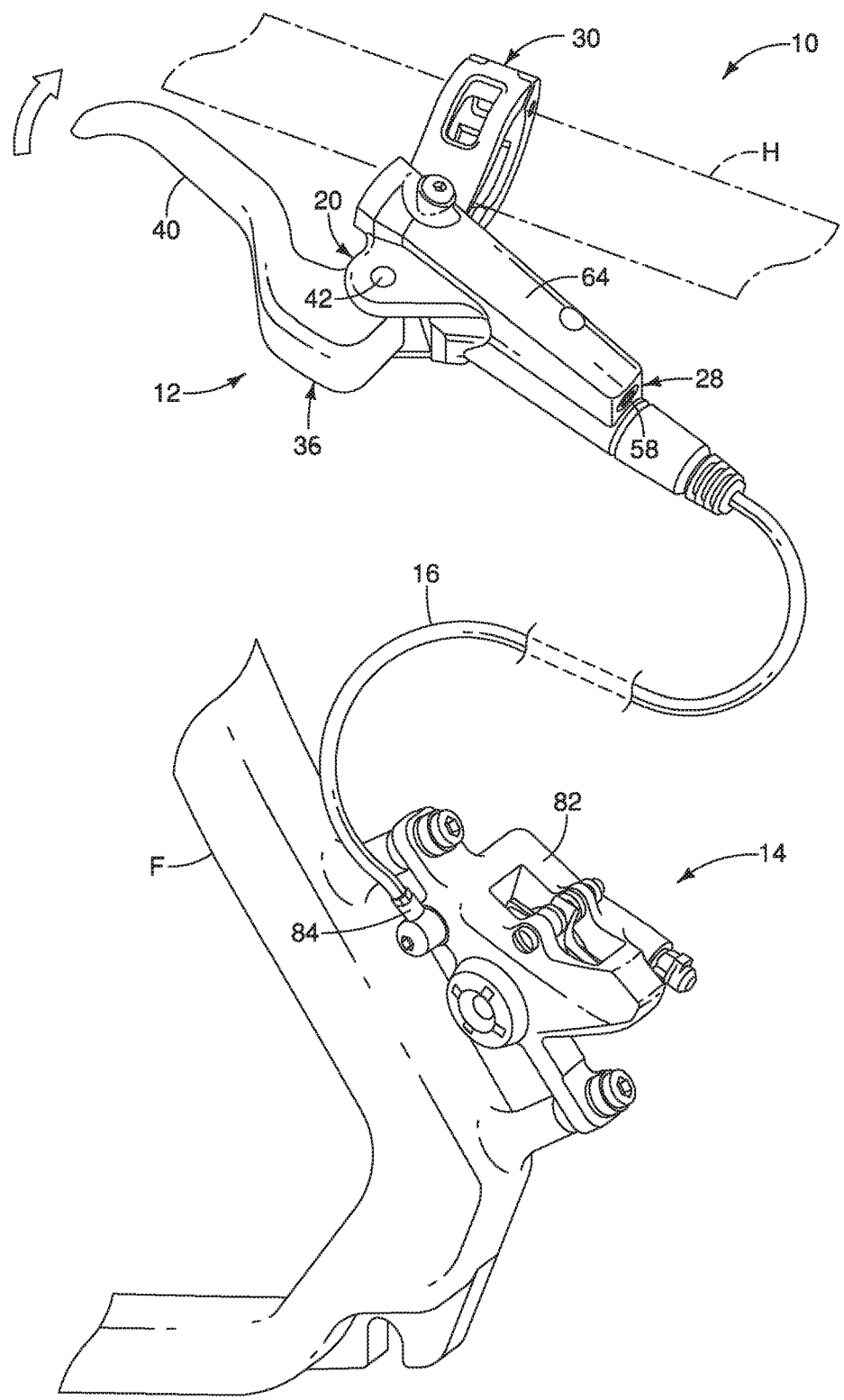
FIG. 2 is a perspective view of the hydraulic operating system illustrated in FIG. 1 but with a brake operating (lever) member of the hydraulic operating device pivoted to a braking or actuated position with respect to a base member of the hydraulic operating device.

Referring initially to FIGS. 1 and 2, a hydraulic operating system 10 for a small vehicle including a bicycle is illustrated in accordance with one illustrative embodiment. Here, the hydraulic operating system 10 is a bicycle hydraulic braking system that is installed on a bicycle of which only a portion of a bicycle handlebar H and a portion of a bicycle frame F are shown. The hydraulic operating system 10 basically comprises a hydraulic operating device 12, a hydraulic operated device 14 and a hydraulic line or hose 16. The hydraulic operating device 12 is fluidly connected to the hydraulic operated device 14 by the hydraulic hose 16. As illustrated in FIGS. 1 and 2, the hydraulic operating device 12 is a right-hand side hydraulic brake actuating device that is operated by the rider's right hand to actuate the hydraulic operated device 14, which is a disc brake caliper in the illustrated embodiment. It will be apparent to those skilled in the bicycle field that the configuration of the hydraulic operating device 12 can be adapted to a left-hand side hydraulic brake actuating device that is operated by the rider's left hand. Also, the hydraulic operating device 12 can be used with other bicycle components other than a disc brake caliper.

Figure 3:
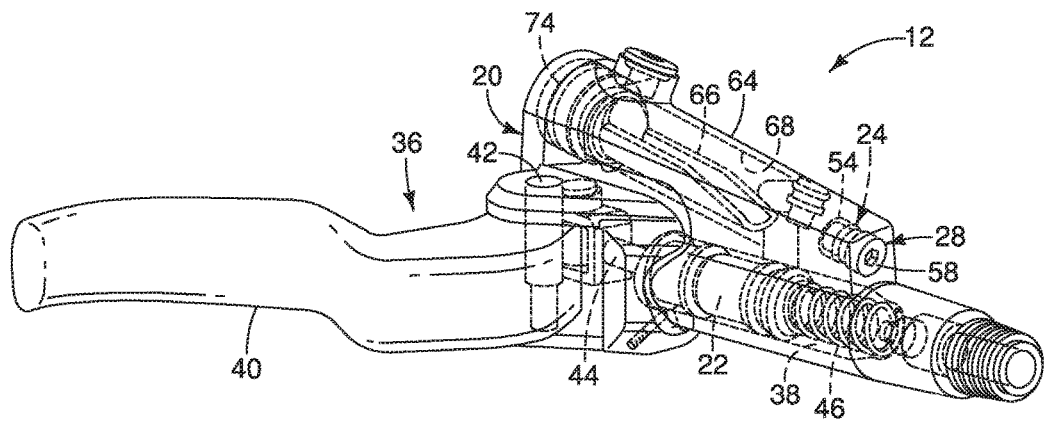
FIG. 3 is an enlarged perspective view of the hydraulic operating device of the hydraulic operating system illustrated in FIGS. 1 and 2.
Figure 4:
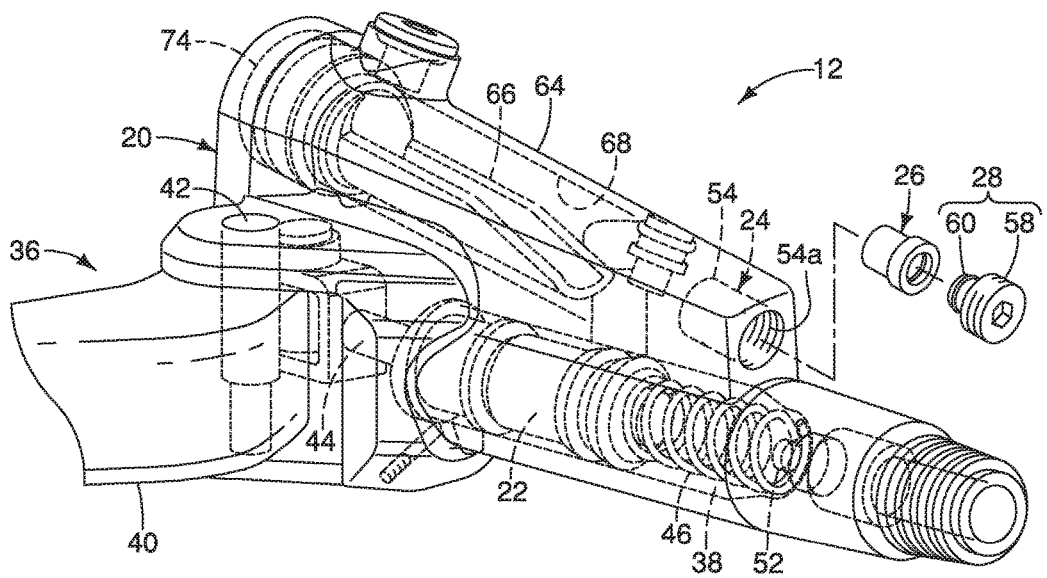
FIG. 4 is an enlarged perspective view, similar to FIG. 3, of the hydraulic operating device but with selected parts (i.e., an adjustment bolt and a diaphragm) exploded from the base member.

As seen in FIGS. 3 and 4, the hydraulic operating device 12 of the hydraulic operating system 10 for a small vehicle including a bicycle basically comprises a base member 20, a piston 22, a hydraulic fluid chamber 24, a diaphragm 26 and a deformation adjustment structure 28. In the illustrated embodiment, the bicycle hydraulic operating device 12 is mounted to the bicycle handlebar H (i.e., a body of a bicycle, namely a bicycle body), and the bicycle hydraulic operated device 14 is mounted to the bicycle frame F (i.e., a bicycle body). However, the hydraulic operating device 12 can be mounted to other parts of the bicycle body or a body of another small vehicle as needed and/or desired. Specifically, in the illustrated embodiment, the base member 20 includes a fixing structure 30 that is configured to fix the hydraulic operating device 12 of the hydraulic operating system 10 to a body of the small vehicle (e.g., the bicycle handlebar H as illustrated). The fixing structure 30 is configured to fix the hydraulic operated device 14 of the hydraulic operating system 10 to the body (e.g., the bicycle handlebar H as illustrated) of the small vehicle. Here, the fixing structure 34 is a hinged tube clamp. Since hinged tube clamps are well known, the fixing structure 34 (i.e., the hinged tube clamp) will not be discussed and/or illustrated in detail.

The hydraulic operating device 12 of the hydraulic operating system 10 further comprises an operating member 36 that is coupled to the piston 22 to move the piston 22. In particular, the base member 20 includes a cylinder bore 38. The piston 22 is movably disposed in the cylinder bore 38. More specifically, in the illustrated embodiment, the operating member 36 includes a lever 40 that is pivotally mounted relative to the base member 20. Here, the lever 40 is pivotally mounted relative to the base member 20 by a pivot pin 42 from a rest (non-operated) position (FIG. 1) to an operated position (FIG. 2). The operating member 36 further includes a push or connecting rod 44 that operatively connects the lever 40 to the piston 22. In this way, for example, the operating member 36 is coupled to the piston 22 to move the piston 22 within the cylinder bore 38.

Figure 5:
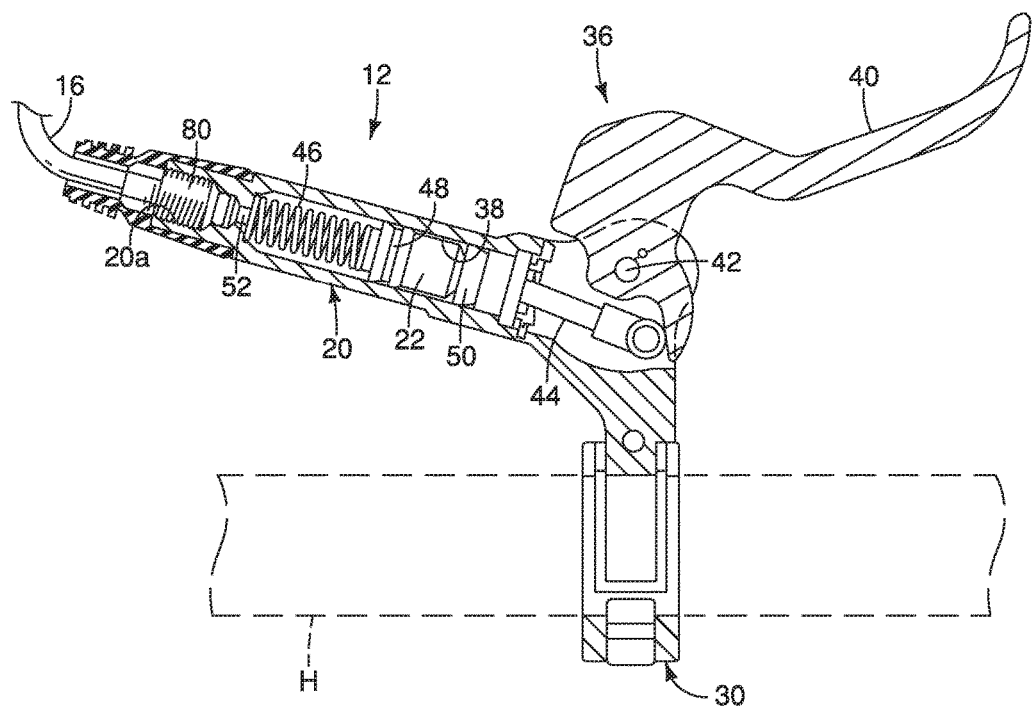
FIG. 5 is a first cross-sectional view of the hydraulic operating device illustrated in FIGS. 1 to 4 as taken along section plane perpendicular to a pivot axis of the brake operating (lever) member and passing through a cylinder axis of a cylinder bore provided in the base member.

The piston 22 is movably arranged in the cylinder bore 38 in a reciprocal manner in response to an operation of the lever 40 of the operating member 36. Preferably, the hydraulic operating device 12 also includes a biasing element 46 (e.g., a coil compression spring) that biases the piston 22 to its initial (rest or non-operated) position and that also biases the lever 40 to its rest position (i.e., no external force applied to the lever 40) as seen in FIG. 5. The piston 22 preferably includes a first sealing ring 48 and a second sealing ring 50. The first and second sealing rings 48 and 50 are in sliding contact with the cylinder bore 38. The first sealing ring 48 is spaced apart from the second sealing ring 50 along a cylinder center axis A (FIG. 7) of the cylinder bore 38. The first and second sealing rings 48 and 50 are preferably elastomeric (e.g., rubber) O-rings that each have a uniform cross sectional profile. The cylinder bore 38 has an outlet port 52 that fluidly connects the cylinder bore 38 to the hydraulic hose 16.

Figure 7:
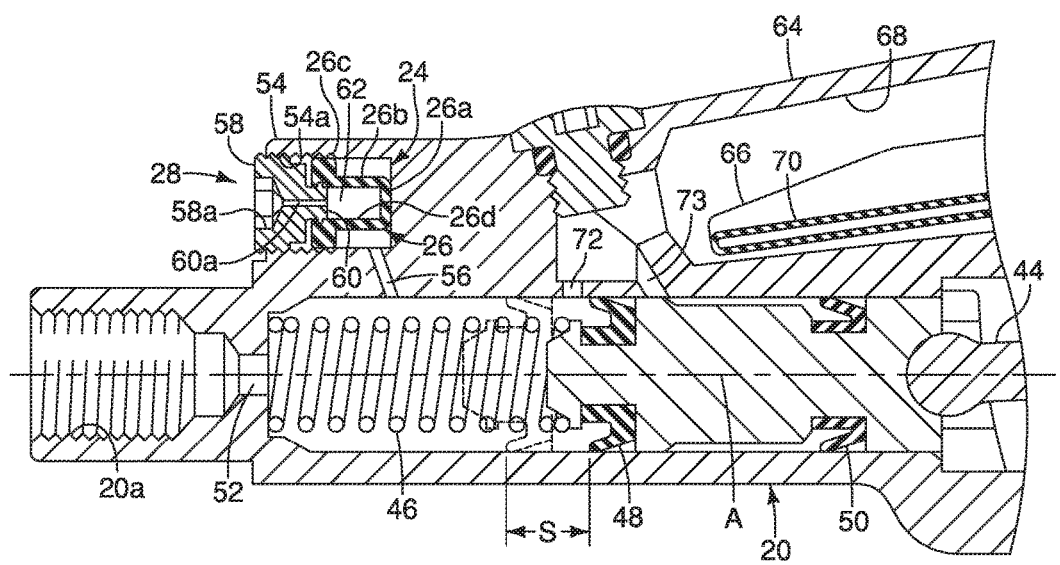
FIG. 7 is a partial cross-sectional view of a portion of the hydraulic operating device illustrated in FIG. 6, in which the adjustment bolt is threaded into the hydraulic fluid chamber to establish a first deformation condition of the diaphragm.
Figure 8:
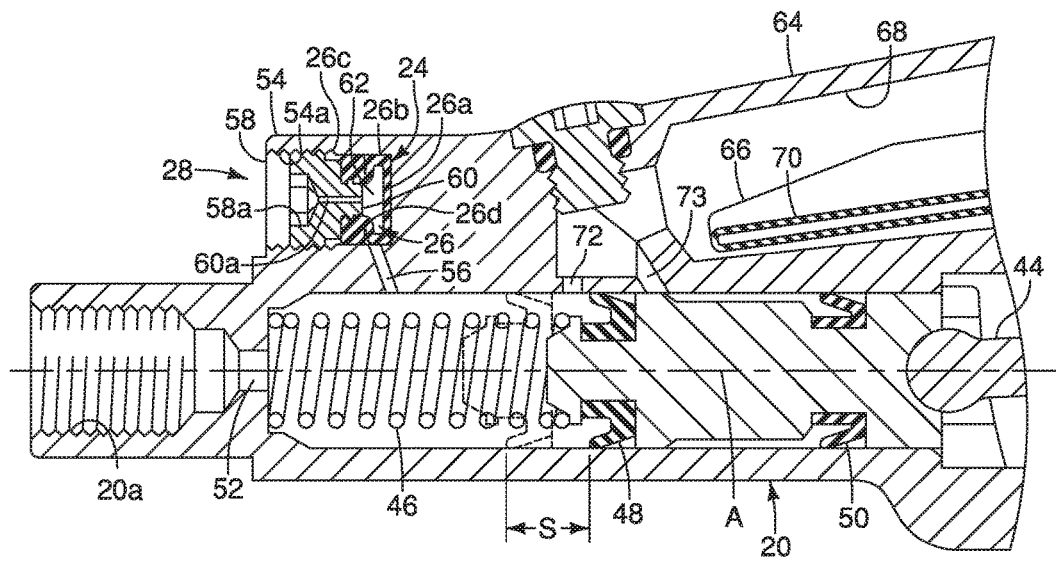
FIG. 8 is a partial cross-sectional view of the portion of the hydraulic operating device illustrated in FIG. 7, but in which the adjustment bolt threaded farther into the hydraulic fluid chamber to change a deformation condition of the diaphragm to a second deformation condition.

Referring now to FIGS. 7 and 8, the base member 20 includes a hydraulic fluid tank 54 in which the diaphragm 26 is at least partially arranged such that the diaphragm 26 at least partially defines the hydraulic fluid chamber 24. Here, the hydraulic fluid tank 54 is integrally formed with the base member 20 as a bore of the base member. In this way, for example, the hydraulic fluid chamber 24 is partially defined by the base member 20. Further, the diaphragm 26 partially defines the hydraulic fluid chamber 24. The hydraulic fluid chamber 24 is fluidly connected to the cylinder bore 38. Here, the hydraulic fluid within the hydraulic fluid chamber 24 is supplied to the cylinder bore 38 via a fluid port 56. In particular, the hydraulic fluid chamber 24 is fluidly connected to the cylinder bore 38 by the fluid port 56 that opens to the cylinder bore 38 at a first location that is outside of a piston stroke S (FIG. 7) of the piston 22. However, alternatively, the hydraulic fluid chamber 24 can be provided on either the hydraulic operated device 14 or the hydraulic hose 16 anywhere between the piston 22 of the hydraulic operating device 12 and a piston (slave piston) of the hydraulic operated device 14.

The deformation adjustment structure 28 includes a bolt 58. The bolt 58 includes a tool engagement recess 58a. As explained later, the bolt 58 allows a user to selectively change a deformation condition of the diaphragm 26. The bolt 58 is threaded to the base member 20. Specifically, the hydraulic fluid tank 54 includes a threaded opening 54a that threadedly receives the bolt 58. In this way, the diaphragm 26 is retained inside the hydraulic fluid tank 54 of the base member 20.

The diaphragm 26 is preferably elastomeric (e.g., rubber) member having a brimmed hat-shape. Basically, the diaphragm 26 has an end wall 26a, an annular wall 26b and an annular flange 26c. In this way, for example, the diaphragm 26 defines a recess 26d. The diaphragm 26 is provided in the hydraulic fluid tank 54 to be elastically deformable in the hydraulic fluid tank 54. Specifically, the diaphragm 26 is deformed by fluid pressure in response to movement of the piston 22 in the cylinder bore 38. Moreover, by screwing or unscrewing the bolt 58 into or from the threaded opening 54a of the base member 20, the diaphragm 26 change the deformation condition of the diaphragm 26.

In particular, as seen in FIGS. 7 and 8, the deformation adjustment structure 28 is configured to selectively change a deformation condition of the diaphragm 26 between at least two different deformation conditions. Here, in the illustrated embodiment, the deformation adjustment structure 28 includes a projection 60 that is disposed in the recess 26d of the diaphragm 26. The bolt 58 adjustably positions the projection 60 in the recess 26d of the diaphragm 26. By changing the position of the projection 60 in the recess of the diaphragm 26, the deformation condition of the diaphragm 26 is changed. Although not shown, the deformation condition of the diaphragm 26 can also be changed by the amount that the bolt 58 compresses the diaphragm 26. Here, preferably, the bolt 58 and the projection 60 are one-piece. However, the bolt 58 and the projection 60 can be separate member as needed and/or desired. The diaphragm 26 at least partly defines an air chamber 62. More specifically, the projection 60 is disposed in the recess 26d of the diaphragm 26 such that the air chamber 62 is formed between the projection 60 and the end wall 26a of the diaphragm 26. The projection 60 includes an air vent 60a that fluidly communicates the air chamber 62 with outside. The tool engagement recess 58a is connected to the air vent 60a. In this way, the air chamber 62 fluidly communicates outside via the tool engagement recess 58a and the air vent 60a.

In the illustrated embodiment, as seen in FIGS. 5 to 8, the hydraulic operating system 10 further comprises a hydraulic reservoir tank 64 that is fluidly connected to the cylinder bore 38. However, the hydraulic reservoir tank 64 can be omitted as needed and/or desired. The hydraulic reservoir tank 64 includes an additional diaphragm 66 that at least partially defining an additional hydraulic fluid chamber 68 and an additional air chamber 70. The additional hydraulic fluid chamber 68 is fluidly connected to the cylinder bore 38 by a reservoir port 72 that opens to the cylinder bore 38 at a second location inside of the piston stroke S of the piston 22. Here, the hydraulic reservoir tank 64 is integrally formed with the base member 20. In this way, the additional hydraulic fluid chamber 68 is partially defined by the base member 20. The additional hydraulic fluid chamber 68 is further fluidly connected to the cylinder bore 38 by an additional reservoir port 73 that opens to the cylinder bore between the first and second sealing rings 48 and 50. The hydraulic reservoir tank 64 has an opening 64a that has a plug 74 disposed therein to retain the additional diaphragm 66 inside the hydraulic reservoir tank 64. Preferably, the plug 74 has an air vent 74a that fluidly communicates the additional air chamber 70 with outside.

Referring back to FIGS. 1 and 2, the hydraulic operating device 12 operates the hydraulic operated device 14 by pivoting the lever 40 from the rest (non-operated) position (FIG. 1) to the operated position (FIG. 2). As the result of a user moving the lever 40 from the rest (non-operated) position (FIG. 1) toward the operated position (FIG. 2), the piston 22 is moved linearly in the cylinder bore 38 along the cylinder center axis A against the force of the biasing element 46. As a result of this linear movement of the piston 22, the biasing element 46 is compressed and the hydraulic fluid (e.g., mineral oil) in the cylinder bore 38 is forced into the hydraulic fluid chamber 24 via the fluid port 56 such that the diaphragm 26 begins to deform. Once the diaphragm 26 has reached its end of deformation, then the hydraulic fluid is forced out of the cylinder bore 38 via the outlet port 52 into the hydraulic hose 16 to actuate the hydraulic operated device 14. By adjusting the amount of deformation that can occur (i.e., the deformation condition) in the diaphragm 26 due to the actuation of the piston 22, the user can adjust a free stroke or dead band amount. As mentioned above, the deformation condition of the diaphragm 26 is adjusted by screwing or unscrewing the bolt 58. According to the deformation adjustment structure 28, the deformation condition of the diaphragm 26 is changed by deforming the diaphragm 26. However, a structure which adjusts a free movement of the diaphragm 26 can be applied as the deformation adjustment structure, instead of the deformation adjustment structure 28 or in addition to the deformation adjustment structure 28.

Figure 6:
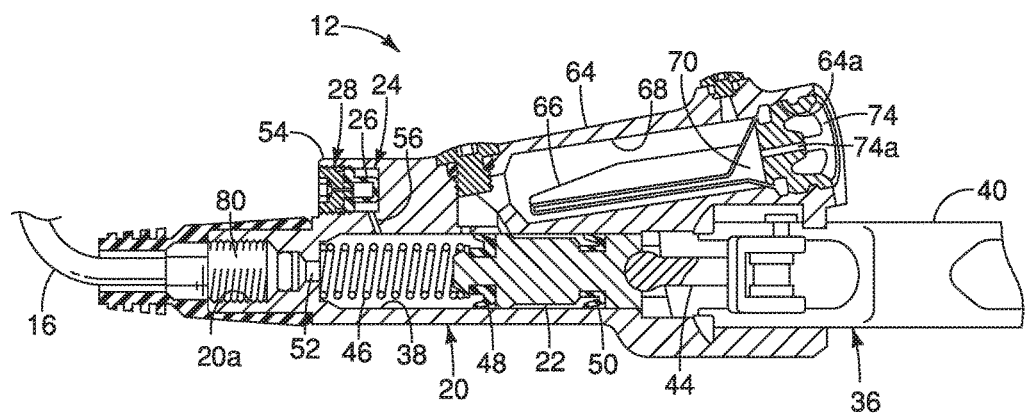
FIG. 6 is a second cross-sectional view of the hydraulic operating device illustrated in FIGS. 1 to 5 as taken along section plane parallel to the pivot axis of the brake operating (lever) member and passing through the cylinder axis of the cylinder bore provided in the base member.

As seen in FIGS. 5 and 6, the hydraulic hose 16 has a first end that is fluidly connected to the cylinder bore 38 by a hose fitting 80 that is threaded into a threaded outlet 20a of the base member 20. As seen in FIGS. 1 and 2, the hydraulic hose 16 has a second end that is fluidly connected to a caliper housing 82 of the hydraulic operated device 14 via a hose fitting 84 in a conventional manner. In this way, the hydraulic operating device 12 is fluidly connected to the hydraulic operated device 14. The hydraulic operated device 14 is a conventional disc brake caliper having at least one slave piston (not shown), and thus, will not be discussed in more detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle (a small vehicle an upright, riding position and equipped with the hydraulic operating system. Accordingly, these directional terms, as utilized to describe the hydraulic operating system should be interpreted relative to a bicycle in an upright riding position on a horizontal surface and that is equipped with the hydraulic operating system. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic operating system for a small vehicle including a bicycle comprising:
   a base member including a cylinder bore;
   a piston movably disposed in the cylinder bore;
   a hydraulic fluid chamber fluidly connected to the cylinder bore;
   a diaphragm at least partially defining the hydraulic fluid chamber, the diaphragm being deformed by fluid pressure in response to movement of the piston in the cylinder bore; and
   a deformation adjustment structure configured to selectively change a deformation condition of the diaphragm between at least two different deformation conditions.

2. The hydraulic operating system according to claim 1, wherein
   the hydraulic fluid chamber is fluidly connected to the cylinder bore by a fluid port that is provided on the base member and opens to the cylinder bore at a first location outside of piston stroke of the piston.

3. The hydraulic operating system according to claim 1, wherein
   the base member includes a hydraulic fluid tank in which the diaphragm is at least partly arranged, and
   the hydraulic fluid chamber is defined between the hydraulic fluid tank and the diaphragm.

4. The hydraulic operating system according to claim 1, wherein
   the diaphragm defines a recess, and
   the deformation adjustment structure includes a projection that is disposed in the recess of the diaphragm.

5. The hydraulic operating system according to claim 4, wherein
   the deformation adjustment structure includes a bolt that adjustably positions the projection in the recess of the diaphragm.

6. The hydraulic operating system according to claim 5, wherein
   the hydraulic fluid chamber is partially defined by the base member, and
   the bolt is threaded to the base member.

7. The hydraulic operating system according to claim 5, wherein
   the bolt and the projection are one-piece.

8. The hydraulic operating system according to claim 5, wherein
   the diaphragm at least partly defines an air chamber, and
   the projection includes an air vent that fluidly communicates the air chamber with outside.

9. The hydraulic operating system according to claim 8, wherein
   the bolt includes a tool engagement recess that is connected to the air vent.

10. The hydraulic operating system according to claim 1, further comprising
    a hydraulic reservoir tank fluidly connected to the cylinder bore.

11. The hydraulic operating system according to claim 10, wherein
    the hydraulic reservoir tank includes an additional diaphragm at least partially defining an additional hydraulic fluid chamber and an additional air chamber.

12. The hydraulic operating system according to claim 11, wherein
    the additional hydraulic fluid chamber is fluidly connected to the cylinder bore by a reservoir port that opens to the cylinder bore at a second location inside of piston stroke of the piston.

13. The hydraulic operating system according to claim 10, wherein
    the additional hydraulic fluid chamber is partially defined by the base member.

14. The hydraulic operating system according to claim 1, further comprising
    an operating member coupled to the piston to move the piston within the cylinder bore.

15. The hydraulic operating system according to claim 14, wherein
    the operating member includes a lever pivotally mounted relative to the base member.

16. The hydraulic operating system according to claim 1, wherein
    the base member includes a fixing structure configured to fix the hydraulic operating system to a body of the small vehicle.

* * * * *